(12) United States Patent
Cho et al.

(10) Patent No.: US 9,110,167 B2
(45) Date of Patent: Aug. 18, 2015

(54) CORRECTION OF SPATIALLY VARIANT PHASE ERROR FOR SYNTHETIC APERTURE RADAR

(75) Inventors: Kwang M. Cho, Los Angeles, CA (US); Antonia T. Cheung, Wildomar, CA (US)

(73) Assignee: THE BOEING COMPANY, Chicago, IL (US)

( * ) Notice: Subject to any disclaimer, the term of this patent is extended or adjusted under 35 U.S.C. 154(b) by 1746 days.

(21) Appl. No.: 12/246,926

(22) Filed: Oct. 7, 2008

(65) Prior Publication Data

US 2010/0086228 A1  Apr. 8, 2010

(51) Int. Cl.
*G06K 9/32* (2006.01)
*G01S 13/90* (2006.01)

(52) U.S. Cl.
CPC ..... *G01S 13/9035* (2013.01); *G01S 2013/9052* (2013.01)

(58) Field of Classification Search
CPC .............................. G01S 13/9035; G06T 17/05
USPC .................... 382/255, 191, 294; 342/25 A, 78
See application file for complete search history.

(56) References Cited

U.S. PATENT DOCUMENTS

| 4,924,229 | A | * | 5/1990 | Eichel et al. | 342/25 E |
| 5,343,204 | A | * | 8/1994 | Farmer et al. | 342/25 F |
| 5,608,404 | A | * | 3/1997 | Burns et al. | 342/25 A |
| 6,781,541 | B1 | * | 8/2004 | Cho | 342/25 D |
| 7,006,031 | B1 | * | 2/2006 | Abatzoglou et al. | 342/25 A |
| 7,006,709 | B2 | * | 2/2006 | Kang et al. | 382/294 |
| 7,145,496 | B2 | * | 12/2006 | Cho et al. | 342/25 R |
| 7,145,498 | B2 | * | 12/2006 | Cho et al. | 342/25 R |
| 7,551,119 | B1 | * | 6/2009 | Doerry | 342/25 R |

OTHER PUBLICATIONS

Ausherman et al., Developments in Radar Imaging, Jul. 1984, IEEE Transactions on Aerospace and Electronic Systems, AES-20 Issue:4, pp. 363-400.*
U.S. Appl. No. 12/135,573, filed Jun. 9, 2008, Cho.

* cited by examiner

*Primary Examiner* — Matthew Bella
*Assistant Examiner* — Dennis Rosario
(74) *Attorney, Agent, or Firm* — Yee & Associates, P.C.

(57) ABSTRACT

A method, apparatus, and computer program product is present for focusing an image. A spatial model for spatial variation in phase error is identified for the image. The image is divided into a number of subpatches based on the spatial model. Phase correction is applied to each of the number of subpatches to form a number of focused subpatches. The number of focused subpatches is merged to form a focused image.

17 Claims, 8 Drawing Sheets

$$H = \begin{bmatrix} 1 & x_1 & y_1 & x_1^2 & x_1 y_1 & y_1^2 \\ 1 & x_2 & y_2 & x_2^2 & x_2 y_2 & y_2^2 \\ \vdots & \vdots & \vdots & \vdots & \vdots & \vdots \\ 1 & x_J & y_J & x_J^2 & x_J y_J & y_J^2 \end{bmatrix} \leftarrow 1000$$

FIG. 10

$$A = \begin{bmatrix} a_2(x_1,y_1) & a_3(x_1,y_1) \\ a_2(x_2,y_2) & a_3(x_2,y_2) \\ \vdots & \vdots \\ a_2(x_J,y_J) & a_3(x_J,y_J) \end{bmatrix} \leftarrow 1100$$

FIG. 11

$$B = \begin{bmatrix} b_{2,00} & b_{3,00} \\ b_{2,10} & b_{3,10} \\ b_{2,01} & b_{3,01} \\ b_{2,20} & b_{3,20} \\ b_{2,11} & b_{3,11} \\ b_{2,02} & b_{3,02} \end{bmatrix} \leftarrow 1200$$

CORRECTION OF SPATIALLY VARIANT PHASE ERROR FOR SYNTHETIC APERTURE RADAR

BACKGROUND INFORMATION

1. Field

The present disclosure relates generally to an improved data processing system and in particular to a method and apparatus for processing image data. Still more particularly, the present disclosure relates to a method, apparatus, and computer usable program code for focusing an image using data generated by synthetic aperture radar.

2. Background

Synthetic aperture radar (SAR) is a form of radar in which a beam is generated that may be used for applications such as, for example, remote sensing and/or mapping. Synthetic aperture radar systems are designed to produce high resolution images in the azimuth direction as well as in the range direction without the need of a large antenna. This type of resolution is achieved with a smaller antenna by integrating a collected array of pulses generated by the synthetic aperture radar system.

Radar antennas may be used with various types of mobile platforms. In one application, a radar antenna may be attached to an aircraft. In another application, the radar antenna may be attached to a spacecraft or satellite.

A single pulse or signal may be radiated from the antenna that may have different dimensions in the horizontal and vertical directions to achieve desired beam width. Oftentimes, the signal radiated from the antenna may illuminate the terrain below the mobile platform outwards towards the horizon. The amplitude and phase of the signal returning from a given location on the ground may be recorded.

Further, the mobile platform may transmit a series of pulses as the mobile platform travels. The responses detected from these pulses may be combined. In other words, a series of different observations or phases may be combined through different processes to generate an image. This image may be, for example, a map of reflectivity including both amplitude and phase. In these examples, phase information is typically discarded. The amplitude information may contain information about ground cover in the same manner as a black and white picture.

Phase error may occur when receiving responses to pulses to form an image. Spatially variant phase error is a phase error that varies with target position for a particular scene. Spatially variant phase error is a phase error that may change with respect to different targets located within a scene or changes in elevation in the target itself. A scene is an area of interest in which radar data is obtained in these examples. A target may be, for example, a vehicle, a ravine, a mountain, or some other object or area of interest.

Spatially variant phase error may be caused by a number of different sources. For example, non-planar motion by the system in which the synthetic aperture radar is contained may cause phase error. Further, targets not in the focus plane also may cause phase error. Changes in terrain elevation of the target may be another source of phase error. These types of phase error are referred to as spatially variant phase errors. Spatially variant phase error results in images that are not uniformly focused across a scene.

In currently available synthetic aperture radar systems, autofocus techniques are used to focus images generated by synthetic aperture radar systems. Autofocus techniques estimate and correct phase error that is common to all targets. However, as the image resolution increases, the phase error may vary with the target location in the scene. As a result, a uniformly focused image may not be produced through this type of approach.

Another approach may involve using terrain elevation data for use in correcting phase error. Although this type of process may be efficient, implementing or actually performing the process becomes more difficult with the need for terrain data. For example, with this type of technique, elevation data for the target area is needed. Further, other techniques may be focused only on correcting for phase error caused by non-planar motion and do not take into account phase error caused by spatial variations.

Therefore, it would be advantageous to have a method, apparatus, and computer program product that overcomes the problems described above.

SUMMARY

In one advantageous embodiment, a method is present for focusing an image. A spatial model for spatial variation in phase error is identified for the image. The image is divided into a number of subpatches based on the spatial model. Phase correction is applied to each of the number of subpatches to form a number of focused subpatches. The number of focused subpatches is merged to form a focused image.

In another advantageous embodiment, an apparatus comprises an autofocus process and a computer on which the autofocus process executes. The autofocus process is capable of identifying a spatial model for spatial variation in phase error for the image, dividing the image into a number of subpatches based on the spatial model, applying phase correction for each of the number of subpatches to form a number of focused subpatches, and merging the number of focused subpatches to form a focused image.

In still another advantageous embodiment, a computer program product is present for focusing an image. The computer program product comprises a computer recordable storage medium and program code stored on the computer recordable storage medium. Program code is present for identifying a spatial model for spatial variation in phase error for the image. Program code is also present for dividing the image into a number of subpatches based on the spatial model. Program code is present for applying phase correction to each of the number of subpatches to form a number of focused subpatches. Program code is present for merging the number of focused subpatches to form a focused image.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
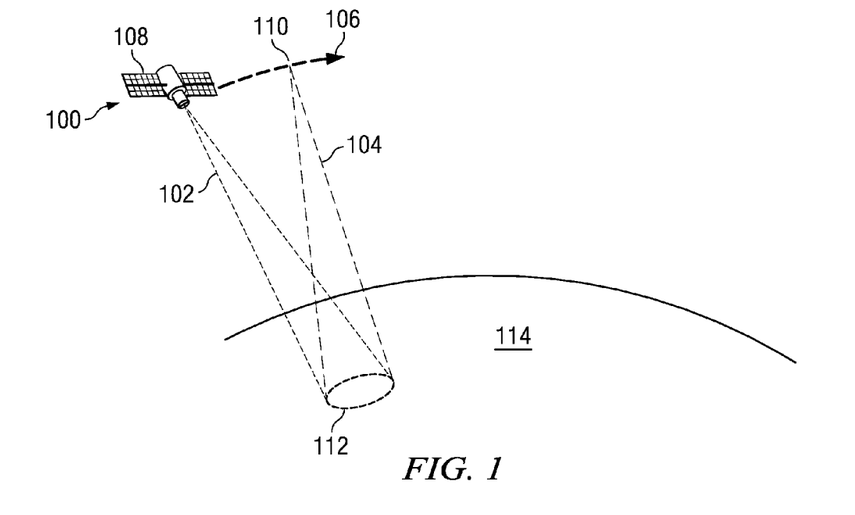
FIG. 1 is a diagram illustrating the collection of data by a synthetic aperture radar system for the case of spotlight mode in accordance with an advantageous embodiment.

With reference now to the figures and in particular with reference to FIG. 1, a diagram illustrating the collection of data by a synthetic aperture radar system for the case of spotlight mode is depicted in accordance with an advantageous embodiment. In this example, satellite 100 may include a synthetic aperture radar system, which may generate an array of pulses such as, for example, pulses 102 and 104 while satellite 100 travels along the direction of dotted line 106. The different dots in dotted line 106 may represent sampling points.

For example, pulse 102 is generated at dot 108, while pulse 104 is generated at dot 110. In these examples, pulses 102 and 104 are radio frequency pulses that illuminate or target section 112 on ground 114. Satellite 100 receives return or response signals from pulses 102 and 104. These responses form radar data. These responses may be recorded as amplitude and phase to form the radar data. In other words, the radar data may take the form of complex values. This information may be used to generate an image for target section 112.

Of course, the different advantageous embodiments may be applied to other types of mobile platforms that carry a synthetic aperture radar system. For example, the different advantageous embodiments may be applied to mobile platforms in the form of a space vehicle, a satellite, a space station, a rocket, a missile, or some other suitable mobile platform.

Figure 2:
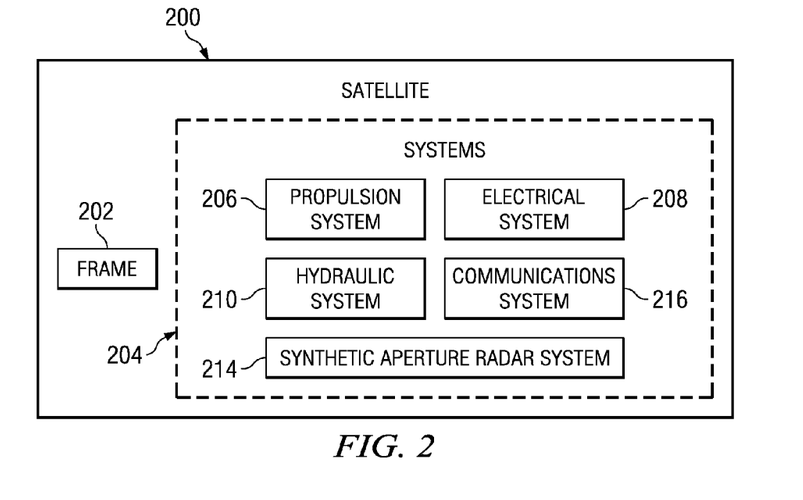
FIG. 2 is a vehicle or structure in which a synthetic aperture radar system may be implemented in accordance with an advantageous embodiment.

With reference now to FIG. 2, a block diagram of a satellite is depicted in which an advantageous embodiment may be implemented. Satellite 200 is an example of one implementation for satellite 100 in FIG. 1. In this example, satellite 200 may include frame 202 with a plurality of systems 204. Examples of systems 204 include one or more of propulsion system 206, electrical system 208, hydraulic system 210, synthetic aperture radar system 214, and communications system 216. Any number of other systems may be included. Synthetic aperture radar system 214 may generate pulses, such as, for example, pulses 102 and 104 in FIG. 1, and collect radar data from responses to pulses 102 and 104 to generate images for various targets.

The illustration of satellite 200 in FIG. 2 is provided as an example of one vehicle or structure in which a synthetic aperture radar system may be implemented. Depending on the particular embodiment, synthetic aperture radar system 214 may be located in other types of vehicles. For example, synthetic aperture radar system 214 may be located in a helicopter, an airship, an aircraft, a spacecraft, or some other mobile platform.

Figure 3:
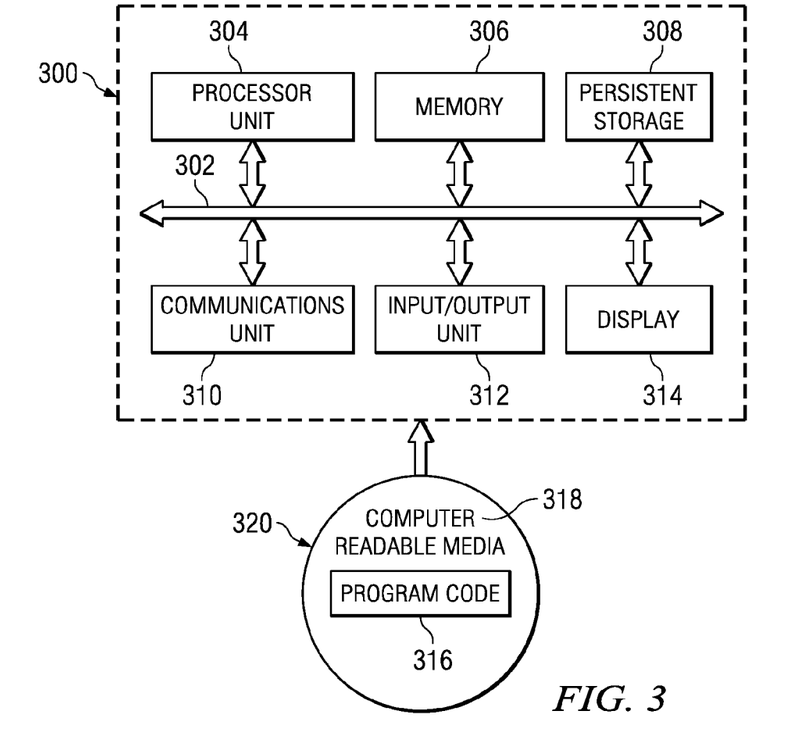
FIG. 3 is a diagram of a data processing system in accordance with an illustrative embodiment.

Turning now to FIG. 3, a diagram of a data processing system is depicted in accordance with an illustrative embodiment. Data processing system 300 is an example of a computer or other device that may be implemented within satellite 200. In particular, data processing system 300 may be used to implement various functionalities and/or processes within synthetic aperture radar system 214 in FIG. 2. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices.

For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse.

Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300.

Other components shown in FIG. 3 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

The different advantageous embodiments recognize that one manner in which auto focusing may be performed is by dividing the image into subpatches. Each of the subpatches may be individually focused. The resulting focused subpatches may be merged into a focused image. This type of approach may be an efficient approach when the size of the subpatches is determined based on various changing conditions. When the subpatches are merged, gain and phase continuity may be insured in the final image by suppressing discontinuity in the phase correction that may be applied to each subpatch.

The different advantageous embodiments also recognize that merely performing local area focusing with subpatches of fixed sizes may not produce desirable results in different situations. Further, the different advantageous embodiments recognize that phase discontinuity may not be controlled by independent estimation and correction of phase error in each patch.

Thus, the different advantageous embodiments provide a method, apparatus, and computer usable program code for correcting phase error which may include spatial variations. In the different advantageous embodiments, a spatial model for spatial variation in phase error is identified for an image. The image is divided into a number of subpatches based on the spatial model. A number as used herein refers to one or more items. For example, a number of subpatches is one or more subpatches. Phase correction is applied to each of the number of subpatches to form a number of focused subpatches. The number of focused subpatches is merged to form a focused image.

Figure 4:
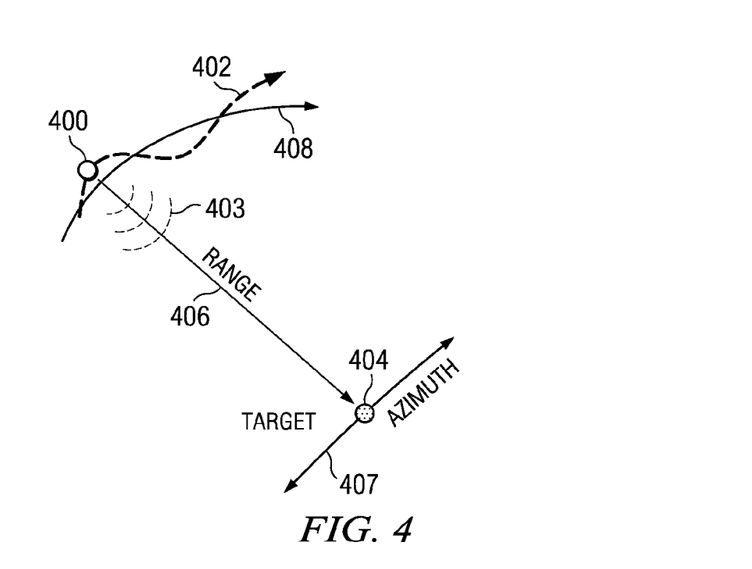
FIG. 4 is a diagram illustrating phase error effects for which corrections may be made in accordance with an advantageous embodiment.

With reference now to FIG. 4, a diagram illustrating phase error effects for which corrections may be made is depicted in accordance with an advantageous embodiment. In this example, synthetic aperture radar system 400 may be implemented using synthetic aperture radar system 214 in FIG. 2.

In this example, synthetic aperture radar system 400 moves along path 402. While moving along path 402, synthetic aperture radar system 400 may send out radio frequency pulses 403 towards a location, such as target 404. The distance from synthetic aperture radar system 400 to target 404 along line 406 is the range. Line 407 indicates the azimuth.

In these examples, phase error may occur because the actual position of synthetic aperture radar system 400 may differ from the identified position for synthetic aperture radar system 400.

In these examples, sensors or other instrumentation may identify synthetic aperture radar system 400 as moving along path 402. In this example, the range between synthetic aperture radar system 400 and target 404 may be different when the actual position of synthetic aperture radar system 400 along path 402 is compared to the identified position for synthetic aperture radar system 400 along path 408.

Phase error also may occur spatially. For example, phase error may occur because of elevational differences in target 404. In other words, phase error may be present with respect to different locations in a scene. In these examples, the dots in path 402 represent different locations at which radar data may be collected. This radar data is raw radar data in these examples.

Figure 5:
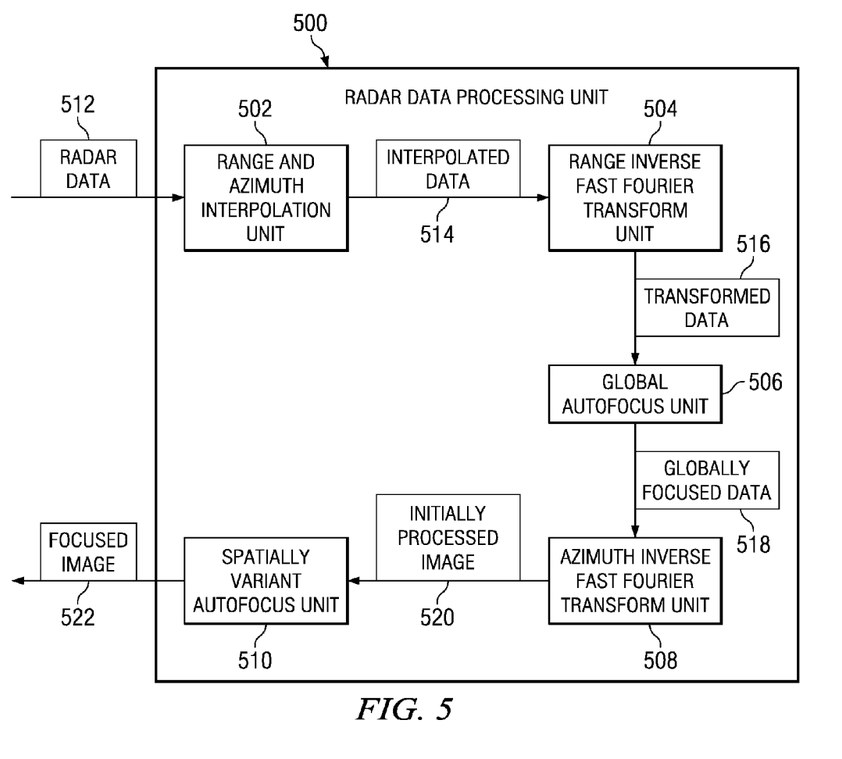
FIG. 5 is a diagram illustrating a radar data processing unit in accordance with an advantageous embodiment.

With reference now to FIG. 5, a diagram illustrating a radar data processing unit is depicted in accordance with an advantageous embodiment. In this example, radar data processing unit 500 is an example of a functional component that may be implemented using a data processing system such as data processing system 300 in FIG. 3. The different components in FIG. 5 may be implemented in software and/or hardware depending on the particular implementation. Radar data processing unit 500 may be found within a synthetic aperture radar system or in a remote location from the synthetic aperture radar system.

In this example, radar data processing unit 500 includes range and azimuth interpolation unit 502, range inverse fast Fourier transform unit 504, global autofocus unit 506, azimuth inverse fast Fourier transform unit 508, and spatially variant autofocus unit 510.

Range and azimuth interpolation unit 502 receives radar data 512. Radar data 512 may be raw radar data from the synthetic aperture radar system or may be partially pre-processed. For example, radar data 512 may be compensated for motion of the platform in which the synthetic aperture radar system is located. Radar data 512 may be sampled data generated by a synthetic aperture radar system, such as synthetic aperture radar system 214 in FIG. 2 after an analog-to-digital conversion. Radar data 512 may be plotted as $K_X$ versus $K_Y$ in which $K_X$ and $K_Y$ are indexed for the pulses and the range samples in each pulse return.

Radar data 512 may be processed by range and azimuth interpolation unit 502 to form interpolated data 514. Range and azimuth interpolation unit 502 interpolates radar data 512 to generate data in rectangular grids. This form of the data allows for Fourier transforms to be applied in the range and azimuth direction for computational efficiency. In these examples, the Fourier transforms applied are inverse fast Fourier transforms.

Range inverse fast Fourier transform unit 504 performs an inverse fast Fourier transform on the range data within interpolated data 514 to form transformed data 516. Transformed data 516 includes range data in which an inverse fast Fourier transform has been performed and interpolated azimuth data. Transformed data 516 also may be referred to as range compressed data.

Transformed data 516 is processed by global autofocus unit 506 to perform global focusing of the image. This type of focusing may take into account phase error caused by changes in the position of the platform on which the synthetic aperture radar system is located. Global autofocus unit 506 generates globally focused data 518. Azimuth inverse fast Fourier transform unit 508 performs an inverse fast Fourier transform on the azimuth portion of globally focused data 518 to generate initially processed image 520.

The inverse fast Fourier transform is performed to transform a function for a discreet or continuous spectrum into a function for amplitude. In other words, azimuth inverse fast Fourier transform unit 508 changes or transforms data for azimuth spatial frequency into image pixels in the azimuth spatial domain. The azimuth spatial domain is the distance along the azimuth. Initially processed image 520 is then processed by spatially variant autofocus unit 510 to generate focused image 522.

Spatially variant autofocus unit 510 includes an autofocus process that may be used to remove phase error caused by spatial variations. As mentioned before, these spatial variations are variations in the location of scene from which radar data is gathered. Phase error may occur due to spatial elevational changes at the target as well as other factors with spatial variation. These other factors may include, for example, non-linear motion by the mobile platform as well as other possible unknown sources of error. A spatial variation may be considered a change in location in the scene. Phase error may change as the location and the scene changes.

Figures 6, 8:
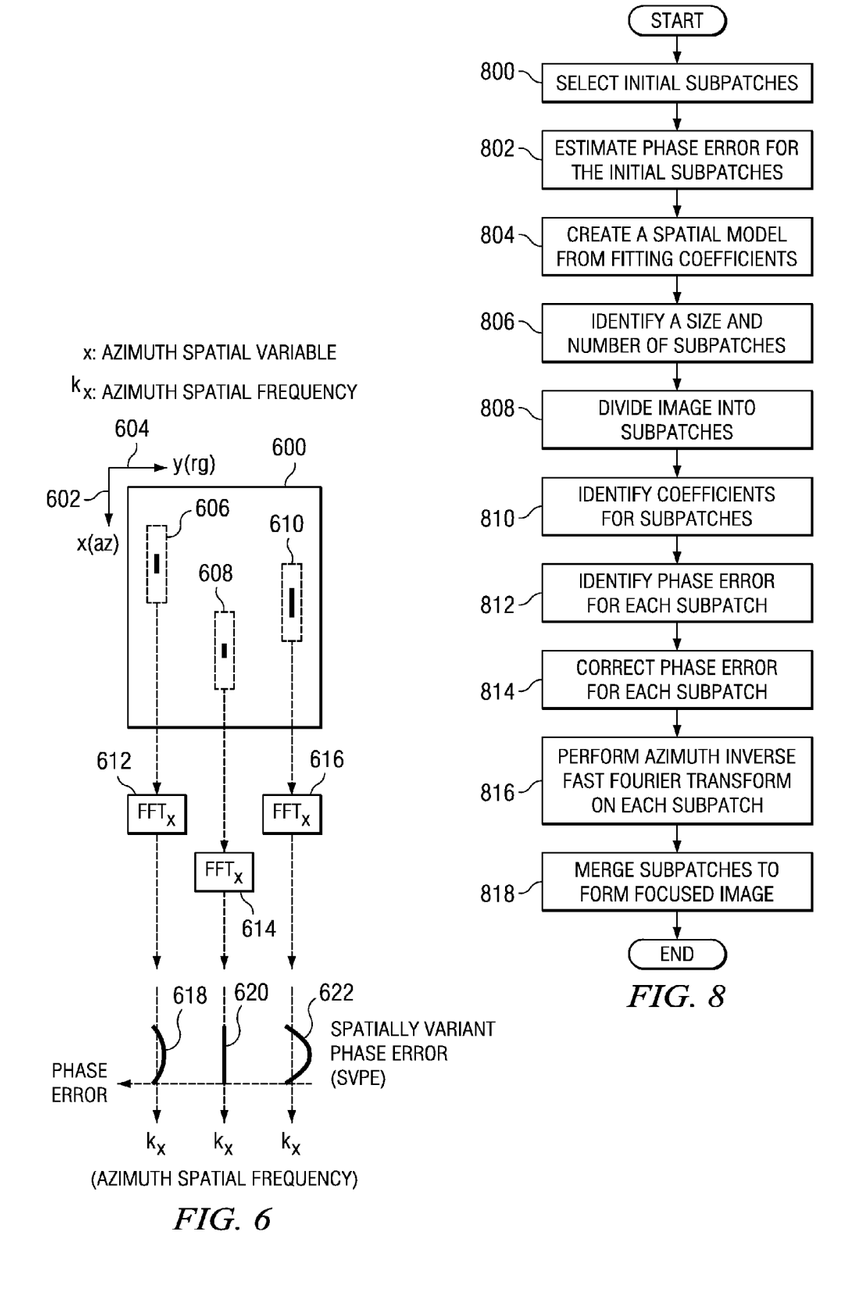
FIG. 6 is a diagram illustrating spatial phase error that may be corrected using an autofocus process in accordance with an advantageous embodiment.
FIG. 8 is a flowchart of a process for correcting phase error in accordance with an advantageous embodiment.

With reference now to FIG. 6, a diagram illustrating spatial phase error that may be corrected using an autofocus process is depicted in accordance with an advantageous embodiment. In FIG. 6, scene 600 is an example of an image, such as initially processed image 520 in FIG. 5. Common phase error may have been removed from scene 600 through a global focusing process.

In these examples, scene 600 is an image with data converted back into azimuth spatial frequency to identify any remaining phase error. In this example, arrow 602 indicates an azimuth direction while arrow 604 indicates a range direction.

Examples of locations within scene 600 include locations 606, 608, and 610. Location 606 may be processed using fast Fourier transform 612, location 608 may be processed using fast Fourier transform 614, and location 610 may be processed using fast Fourier transform 616. This processing results in phase errors 618, 620, and 622. These phase errors are different from each other and are considered spatially variant phase errors. These phase errors vary spatially.

In other words, the phase errors vary over different locations within scene 600. The different advantageous embodiments may be used to correct for the phase error caused by spatial variations. The term "spatial variant phase error" is used to mean that phase error such as at location (x,y) in the image changes. This phase error may be in the azimuth spatial frequency $k_x$. The azimuth spatial frequency is the counterpart of the azimuth spatial variable or azimuth bins (pixels) in the image that are related by Fourier transforms as indicated in FIG. 6.

Figure 7:
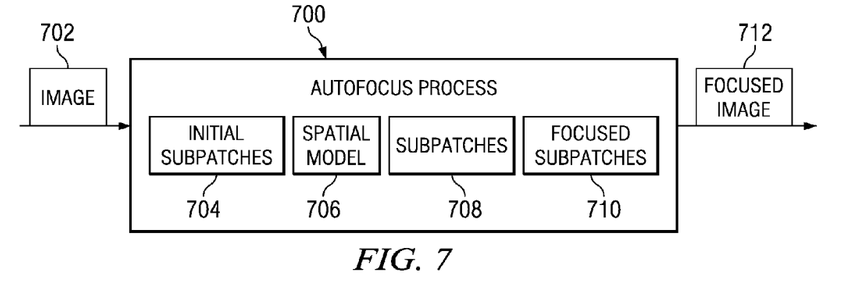
FIG. 7 is a diagram illustrating phase error processing in accordance with an advantageous embodiment.

With reference now to FIG. 7, a diagram illustrating phase error processing is depicted in accordance with an advantageous embodiment. In this example, autofocus process 700 is an example of spatially variant autofocus unit 510 in FIG. 5. Autofocus process 700 receives image 702. Image 702 may be, for example, initially processed image 520 from FIG. 5. Autofocus process 700 identifies initial subpatches 704. Initial subpatches 704 are a number of subpatches. Initial subpatches 704 may only be a few subpatches within image 702. Initial subpatches 704 may not cover all of image 702.

Initial subpatches 704 are used by autofocus process 700 to generate spatial model 706. Spatial model 706 is a model that identifies spatial variation in phase error for image 702. Autofocus process 700 may then divide image 702 into subpatches 708 using spatial model 706. Autofocus process 700 then applies phase correction to each subpatch within subpatches 708 to form focused subpatches 710. Focused subpatches 710 may then be merged to form focused image 712. Focused image 712 is an example of focused image 522 in FIG. 5.

Spatial model 706 is used to identify how many subpatches are needed for subpatches 708. The number of subpatches may be based on the size of subpatches needed to properly focus the image for phase error that may have occurred due to spatial variation.

With reference now to FIG. 8, a flowchart of a process for correcting phase error is depicted in accordance with an advantageous embodiment. The process illustrated in FIG. 8 may be implemented in a process such as, for example, autofocus process 700 in FIG. 7.

The process begins by selecting initial subpatches (operation 800). Instead of correcting phase error independently for each subpatch based on individual estimation, the different advantageous embodiments obtain the correct phase from a spatial model derived from sets of parameters that model the phase error from initial subpatches. In these different advantageous embodiments, the estimation of the local phase error for the initial subpatches may be performed using model-based parametric autofocus methods that are currently used.

The method selected may be one that obtains a reliable phase error estimation from initial subpatches of a reduced size. In these examples, the subpatches are selected to have a smaller size.

In selecting the number of initial subpatches, the maximum order of the polynomial that spatially fits the estimated model parameters from the initial subpatches is set based on an assumed feature for potential errors or observed results. In these examples, quadratic phase error caused by non-planar platform motion with quadratic maneuverability linearly changes with the target elevation off focus from the target plane.

Since a high model order for the spatial variation leads to increased complexity, it is desired to keep the model order for the spatial variation reasonably low, but high enough to handle general situations. Spatial variation of phase error due to non-planar motion when mapping terrain with changing elevation may depend on the maneuvering characteristics of the radar platform and the variation of terrain elevation. Assuming quadratic maneuvering and quadratic variation of terrain elevation, a second order model is considered reasonable in these examples and hence the number of initial subpatches in the direction of terrain variation is at least three.

In these examples, the terrain elevation expressed by a second order polynomial may employ a model order for the spatial variation of phase error as being two. Of course, this is selected only for this particular illustrative example and other advantageous embodiments may use higher order spatial models by increasing the dimensions of matrices used for various calculations.

The number of initial subpatches for the estimation of local phase error may be selected to be greater than the maximum order by at least one in both the range direction and azimuth direction. For example, with a spatial model order of two, the number of initial subpatches should be at least three subpatches. The size of the initial subpatches in this operation should be selected to be small enough to represent local phase error while being large enough to obtain a correct estimation of the phase error. In these illustrative examples, one-tenth of the imaged dimension may be a reasonable size for initial subpatches.

Figure 9:
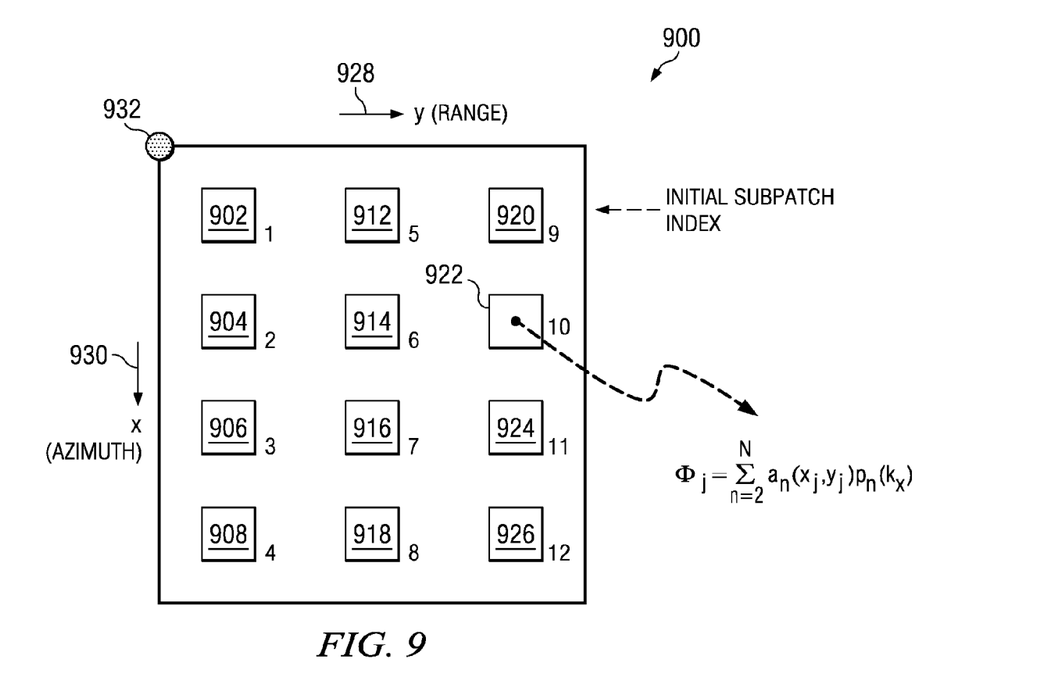
FIG. 9 is a diagram illustrating initial subpatches in accordance with an advantageous embodiment.

With reference to FIG. 9, a diagram illustrating initial subpatches is depicted in accordance with an advantageous embodiment. Image 900 has subpatches 902, 904, 906, 908, 912, 914, 916, 918, 920, 922, 924, and 926. Each of these subpatches is associated with an index as shown by the reference numerals next to each subpatch. Arrow 928 shows the direction of range while arrow 930 shows the direction of azimuth in these examples. In this illustration, the coordinates of each initial subpatch centers with reference point 932, which is located in the upper left-hand corner of image 900. These coordinates may be expressed as $(X_j, Y_j)$ for initial subpatches indexed by j=1, 2, . . . J, where J=12 in this particular illustrative example.

Referring back to FIG. 8, the process may then estimate the phase error for the initial subpatches (operation 802). The estimation of the phase error for the initial subpatches may be performed using model-based parametric autofocus methodologies. This type of method may be used because the spatial variation of phase error can be represented by a polynomial that fits model parameters of the phase error. For example, phase error may be expressed as follows:

$$\Phi(k_x, x, y) = \sum_{n=2}^{N} a_n(x, y) p_n(k_x) \quad (1)$$

where $\phi(k_x, x, y)$ is the phase error, x is the azimuth, y is the range, $k_x$ is the spatial frequency in the azimuth direction, $k_y$ is the spatial frequency in the range direction, $p_n(k_x)$ is a Legendre polynomial for a phase error model, and $a_n(x,y)$ is a coefficient that is a function of range and azimuth.

With the illustration of the subpatches in FIG. 9, the phase error for a particular initial subpatch j may be expressed as follows:

$$\Phi_j(k_x, x_j, y_j) = \sum_{n=2}^{N} a_n(x_j, y_j) p_n(k_x) \quad (2)$$

The process then creates a spatial model from fitting coefficients (operation 804). In these examples, the spatial model may be formed using equation (2) above. In operation 804, the spatial model identifying spatial variation of phase error may be modeled by fitting or identifying coefficients $a_n(x_i, y_i)$ for a polynomial as follows:

$$a_n(x,y) = b_{n,00} + b_{n,10}x + b_{n,01}y + b_{n,20}x^2 + b_{n,11}xy + b_{n,02}y^2 + \ldots \quad (3)$$

When N is equal to 3 in equation (1) for a phase error model and the polynomial order is said to be equal to 2 in equation (3) for spatial phase variation, an expression to obtain b may be as follows:

$$H \cdot B = A \quad (4)$$

Figure 10:
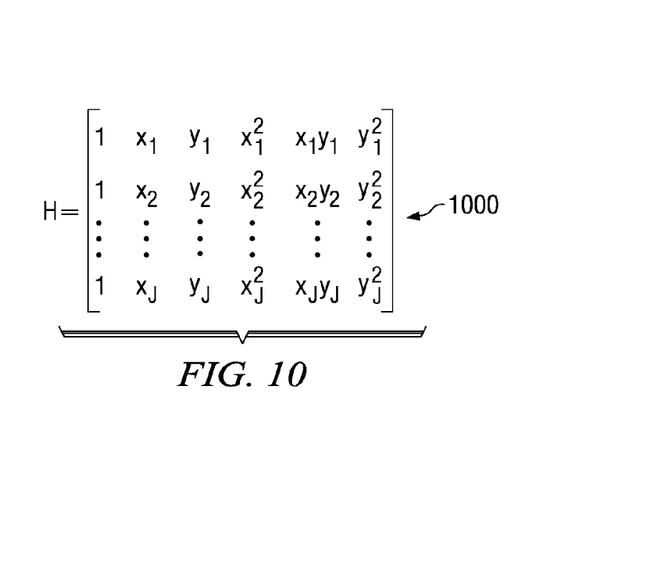
FIG. 10 is an example of matrix H in accordance with an advantageous embodiment.
Figure 11:
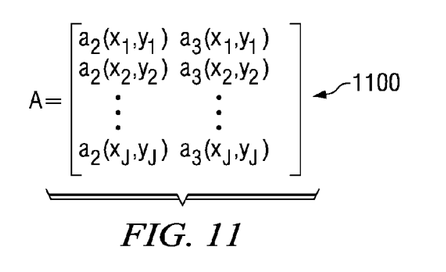
FIG. 11 is an example of matrix A in accordance with an advantageous embodiment.
Figure 12:
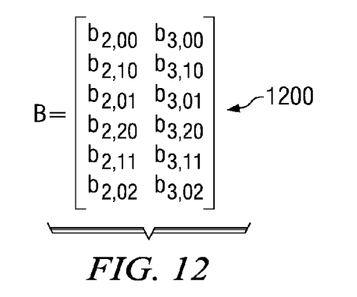
FIG. 12 is an example of matrix B in accordance with an advantageous embodiment.

In FIG. 10, matrix 1000 represents one example of matrix H. In FIG. 11, matrix 1100 illustrates one example of matrix A. Next, in FIG. 12, matrix 1200 represents one example of matrix B.

A solution of a least squares fit for matrix B may be obtained using a pseudo inverse matrix as follows:

$$B = [H^T H]^{-1} H^T \cdot A \quad (5)$$

where the superscript T indicates a matrix transpose. The spatial variation of phase error may be characterized by matrix B which specifies the polynomial to use for the calculation of phase error for new subpatches.

With reference back to FIG. 8, the process then identifies a size and number of subpatches (operation 806). In these examples, the size and number of subpatches may be identified based on how the phase changes spatially. Spatial variation of phase is characterized by the coefficients in matrix B.

Since phase errors vary spatially, each subpatch may have a different phase error to be corrected. The phase error model coefficient $a_n(x_s, y_s)$ can be calculated using equation (10) below at the new subpatch center $(x_s, y_s)$ for new subpatch s. Then, $\Phi_s(k_x)$, phase to be corrected, can be calculated using the calculated coefficients $a_n(x_s, y_s)$ in equation (11) below. Phase error correction is done using $\Phi_s(k_x)$ in equation (12) below.

Subpatches in operation 806 may be determined from the amount of overlap between the subpatches. This overlap may be identified from the spatial variation of phase across the scene in the range direction and the azimuth direction. One manner for identifying the number of subpatches is to use a maximum phase derivative to obtain the total phase changes from all phase error orders in the range direction and the azimuth direction.

The total phase changes are divided by the desired phase bound. The approximate phase error bound can provide for a good balance between performance and computational efficiency since the test logic in equations (6) and (7) are not based on the exact expression for total phase. In this illustrative example, the phase error bound was set π/4 and π/6 for the second and third order terms in the simulation.

The phase error as expressed in equation (1) may be controlled by a coefficient $a_n(x,y)$. The greatest change of the coefficient can be found by differentiating $a_n(x, y)$ expressed in equation (3) in terms of x and y and searching for the maximum value in each direction. With a one-dimensional search, the coupling cross-product terms are neglected. The total phase change is computed by multiplying the estimated slope to data length.

The total phase change may be divided by desired phase bounds to identify the number of subpatches in each order term to limit the applied phase difference within the desired phase bound for each power term in the phase error model. The number of required subpatches in each direction is then the greatest from all order terms. With quadratic and cubic phase error bounds $\Delta a_2$ and $\Delta a_3$, the number of subpatches in each direction within the image may be obtained as follows:

$$N_{sub,x} = \max \left\{ \left\lceil \left| \frac{L_x \cdot \max_x |b_{2,10} + 2b_{2,20}x|}{\Delta a_2} \right| \right\rceil, \left\lceil \left| \frac{L_x \cdot \max_x |b_{3,10} + 2b_{3,30}x|}{\Delta a_3} \right| \right\rceil \right\} \quad (6)$$

$$N_{sub,y} = \max \left\{ \left\lceil \left| \frac{L_y \cdot \max_y |b_{2,01} + 2b_{2,02}y|}{\Delta a_2} \right| \right\rceil, \left\lceil \left| \frac{L_y \cdot \max_y |b_{3,01} + 2b_{3,02}y|}{\Delta a_3} \right| \right\rceil \right\} \quad (7)$$

where $L_x$ and $L_y$ are the data length in x and y, respectively, and $\lceil X \rceil$ indicates the ceiling operation for the least integer greater than or equal to X. A ceiling operation produces the smallest integer greater than or equal to the argument, in this case X.

For example, $\lceil 3.125 \rceil = 4$. In operation 806, overlapping of subpatches should occur in a manner that avoids rippled data around the edges of a subpatch. A block of data with sharp edges is transformed by fast Fourier transform, a phase or gain application, and then a transformation back by an inverse fast Fourier transform may result in ripples or changes in both magnitude and phases around the edge of the block of data. In these examples, the overlap width may be set to a fixed number, such as, for example, 50 image samples. [$S_{ov}$ in equations (8) and (9) is related to the overlap image samples given by $S_{ov}=N_{ov} \cdot d_{pxl}$, with $d_{pxl}$ representing pixel spacing, and $N_{ov}$ representing the overlap samples.

The size of the subpatches may be calculated as follows:

$$S_{sub,x} = \frac{S - S_{ov}}{N_{sub,x}} + S_{ov} \quad (8)$$

$$S_{sub,y} = \frac{S - S_{ov}}{N_{sub,y}} + S_{ov} \quad (9)$$

where S represents the size of the image, $S_{ov}$ is the overlap, $S_{sub,x}$ is the size of the patch in the range direction, $S_{sub,y}$ is the size of the patch in the azimuth direction. The process then divides the image into subpatches (operation 808). This division is both in the range and azimuth directions based on the dimensions identified in operation 806.

With these new subpatches, the center coordinates of a new subpatch may be identified. The process then identifies coefficients for the subpatches (operation 810). In these examples, the coefficients $a_n(x_s,y_s)$ may be calculated as follows:

$$a_n(x_s,y_s)=b_{n,00}+b_{n,10}x_s+b_{n,01}y_s+b_{n,20}x_s^2+b_{n,11}x_sy_s+b_{n,02}y_s^2, n=2,3 \quad (10)$$

where s identifies a subpatch and $x_s$ and $y_s$ represent center coordinates for subpatch S.

The process then identifies the phase error for each subpatch (operation 812). In these examples, the phase error for a subpatch that is centered at the coordinates $(x_s,y_s)$ may be calculated using a model coefficient $a_n(x_s,y_s)$ as follows:

$$\Phi_s(k_x) = \sum_{n=2}^{3} a_n(x_s, y_s)p_n(k_x) \quad (11)$$

The process then corrects the phase error for each subpatch (operation 814). In these examples, the phase error is corrected in the range compressed data which may be represented as $u_s(k_x,y)$ using the following:

$$u_{s,svaf}(k_x,y)=u_s(k_x,y)\exp[-j\Phi_s(k_x)] \quad (12)$$

In these examples, range compressed data may be, for example, transformed data 516 in FIG. 5. In this example, transformed data 516 may be obtained by performing an azimuth fast Fourier transform on each subpatch. This processing is performed to place the data in a form of azimuth spatial frequency from azimuth image samples.

The process then performs an azimuth inverse fast Fourier transform on each subpatch (operation 816). This operation produces an image for the particular subpatch. The inverse fast Fourier transform may be performed on the compressed data using the following:

$$U_{s,svaf}(x,y)=IFFT_{k_x}\{u_{s,svaf}(k_x,y)\} \quad (13)$$

The process merges the subpatches to form the focused image (operation 818). In operation 818, the merging of the subpatches may be performed in a number of different ways. For example, the phase corrected subpatches may be combined by cutting and pasting the subpatches together. In other words, the edges of each subpatch may be aligned with an edge of another subpatch. In another embodiment, overlapped areas may be combined with linear weighting.

Figure 13:
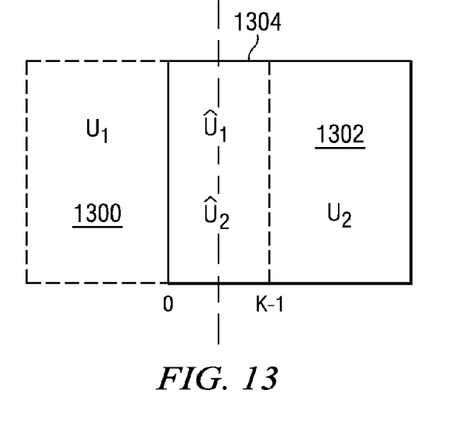
FIG. 13 is a diagram illustrating an overlapped patch in accordance with an advantageous embodiment.

With reference to FIG. 13, a diagram illustrating an overlapped patch is depicted in accordance with an advantageous embodiment. In this example, subpatch 1300 and subpatch 1302 have overlapping area 1304.

Figure 14:
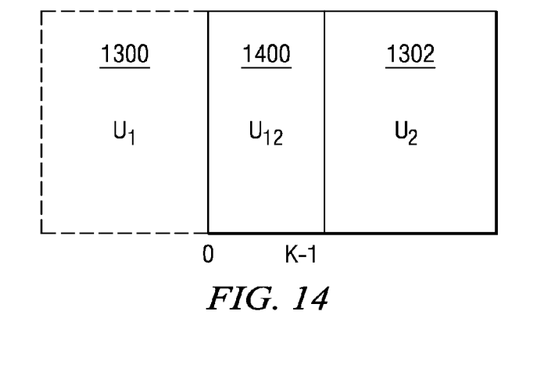
FIG. 14 is a diagram illustrating combined subpatches in accordance with an advantageous embodiment.

With reference now to FIG. 14, a diagram illustrating combined subpatches is depicted in accordance with an advantageous embodiment. As can be seen in this example, the overlapping area between subpatch 1300 and subpatch 1302 have data that may be merged to form merged area 1400. The merging of the data may be performed using the following equation:

$$U_{12}(k) = \frac{(K-1-k) \cdot \hat{U}_1(k) + k \cdot \hat{U}_2(k)}{K-1}, \quad (14)$$

$$k = 0, 1, \ldots, K-1$$

in which $\hat{U}_1(k)$ and $\hat{U}_2(k)$ represent two patches with an overlapping area where k is equal to 0, 1, . . . K–1. In these examples, k is the image pixel index in the overlap region. K is the total number of image samples in the direction of merging in the overlap region in these examples.

Figure 15:
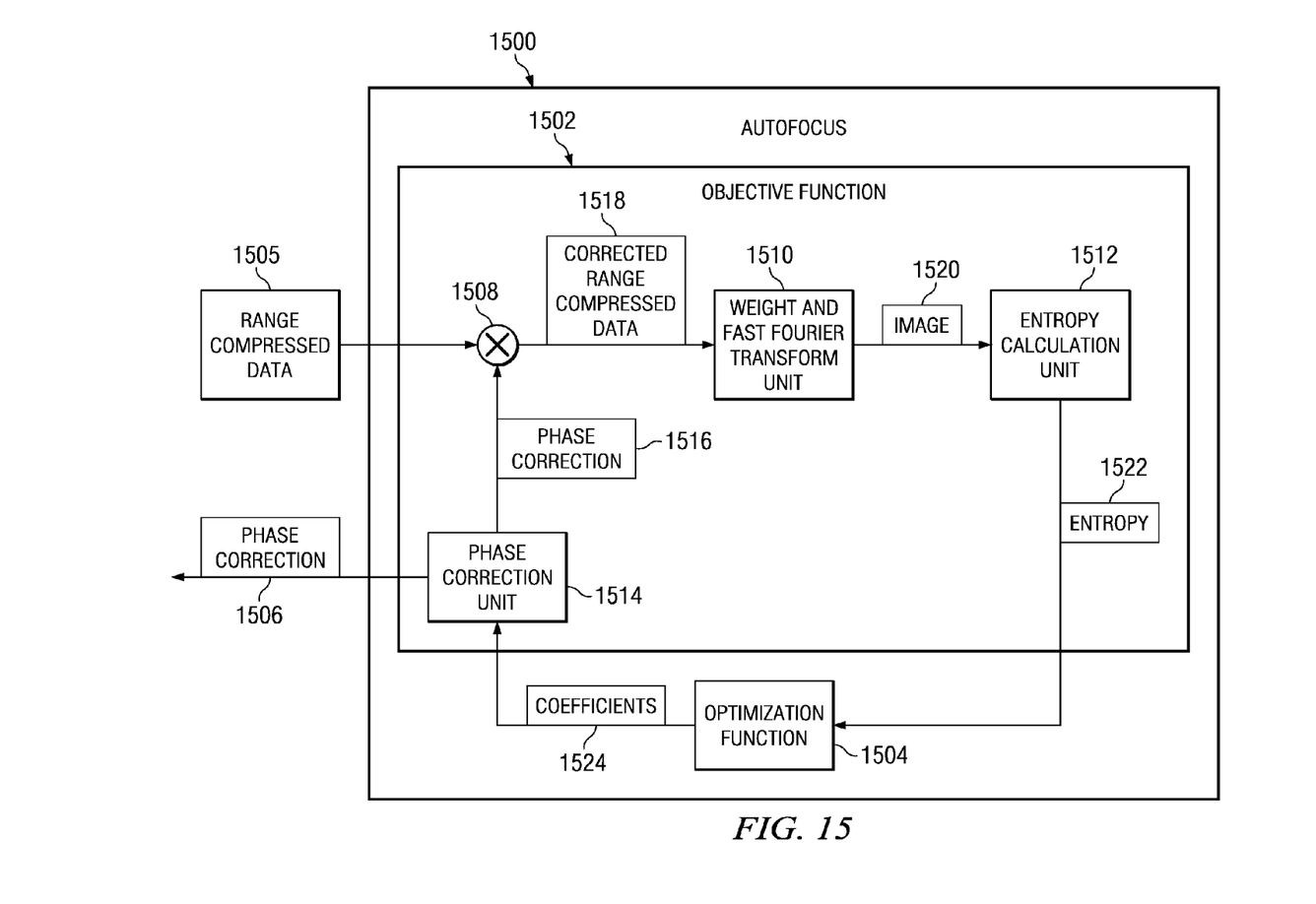
FIG. 15 is a diagram illustrating components that may be used to identify phase error and perform autofocusing in accordance with an advantageous embodiment.

With reference now to FIG. 15, a diagram illustrating components that may be used to identify phase error and perform autofocusing is depicted in accordance with an advantageous embodiment. Autofocus 1500 is an example of components that may be implemented within autofocus process 700 in FIG. 7 that may be used to generate a phase correction for different subpatches. Further, these components also may be used within global autofocus unit 506 in FIG. 5 to identify phase corrections for globally focusing image data.

In this example, autofocus 1500 includes objective function 1502 and optimization function 1504. Objective function 1502 receives range compressed data 1505 and generates phase correction 1506 working in conjunction with optimization function 1504. In these examples, the range compressed data is similar to transformed data 516 in FIG. 5.

In this example, objective function 1502 includes phase summing unit 1508, weight and fast Fourier transform unit 1510, entropy calculation unit 1512, and phase correction unit 1514. In these examples, phase correction unit 1514 may model the phase error using a polynomial. This polynomial may be in terms of azimuth spatial frequency. In these particular examples, the polynomial is a Legendre polynomial, which is well known to those of one of ordinary skill in the art.

In these examples, range compressed data 1505 is a portion of the range compressed data for the image. In these examples, range compressed data 1505 is data that has been interpolated in the range and azimuth directions and in which a range inverse fast Fourier transform has been performed on the interpolated data.

In these examples, the compressed data has a range identified as $s(k_x,j)$ for a range bin j and azimuth spatial frequency $k_x$. From this range compressed data, a set of range bins is selected to form corrected range compressed data 1518 for use in estimating the phase error in the next iteration. A set, as used herein, refers to one or more items. For example, a set of range bins is one or more range bins. In these examples, the set of range bins may be selected as having a power that is greater than some selected threshold number.

Alternatively, a number of range bins having the greatest power may be selected. In these examples, power may be defined as an average or total power in each range bin. Data in this stage is compressed in range but not with respect to azimuth. In these examples, a range column of strong intensity in the spatial domain is selected. This spatial domain may be a domain for the image. The azimuth power in the spatial frequency is the same as the power in the spatial domain.

Each element or each power in a range bin is the magnitude or amplitude squared value at each azimuth spatial frequency. The range bin power is the sum of the power over the different frequencies. For example, these range bins may be selected as follows: $\hat{s}(k_x,\hat{j})=s(k_x, j)$ if $$\sum_{k_x} |s(k_x, j)|^2 \geq \frac{1}{A} \cdot \max_j \sum_{k_x} |s(k_x, j)|^2 \qquad (15)$$

where $\hat{s}(k_x, \hat{j})$ is a subset of $s(k_x, j)$ at range bins selected based on range bin power, $s(k_x, j)$ is data after range compression (complex data), $k_x$ is azimuth spatial frequency index, j is range bin index, $\hat{j}$ is reordered index of selected range bins, and A is a constant for the selection of range bins with strong intensity for use in phase error estimation. In this example, X and y represent the azimuth and range indexes in the spatial domain.

In these examples, a default value for A may be set at 10 for a 20 dB threshold below the strongest range bin. The number of range bins also may be limited depending on the particular implementation.

Phase correction unit 1514 may generate a phase correction, $\Delta\Phi(k_x)$, using $P_n(k_x)$, which is $n^{th}$-order term of a Legendre polynomial as a function of $k_x$. In these examples, the $n_{th}$ term may be generated recursively from lower order terms. The order of the polynomial may be set high enough such that the phase error may be properly represented based on various assumptions about the movement of the synthetic aperture radar system. This polynomial has a set of coefficients which may have a default or initial value. In the different advantageous embodiments, optimization function 1504 may be used to optimize the coefficients as described below.

Phase correction unit 1514 generates phase correction 1516 which may be applied to range compressed data 1505 to form corrected range compressed data 1518. In these examples, phase correction 1516 may be represented as follows:

$$\Delta\Phi(k_x) = \sum_{n=2}^{N} a_n P_n(k_x) \qquad (16)$$

where $\Delta\Phi(k_x)$ is the phase correction, $P_n(k_x)$ is $n^{th}$-order term of Legendre polynomial as a function of $k_x$, $k_x$ is the azimuth spatial frequency index, N is order of the Legendre polynomial properly set based on presumed maximum order of the phase error, n is the index, x is the azimuth spatial index, and $a_n$ is the coefficient to be determined to minimize the image entropy using the optimization method.

Applying an optimization technique called the Broyden-Fletcher-Goldfarb-Shammo (BFGS) produces a final set of these coefficients, and focused image can be obtained when the phase is corrected using Legendre polynomial with this final coefficients set. As mentioned above, spatial frequency is the counterpart of the spatial variable that is related by a fast Fourier transform. Images in spatial domain and defocusing an image is mainly due to phase error in spatial frequency domain. Therefore, the different advantageous embodiments estimate and correct the phase error in spatial frequency domain to get the focused image. The illustrative examples defocus in the azimuth direction.

Thereafter, phase summing unit 1508 may apply phase correction 1516 to range compressed data 1505 to form corrected range compressed data 1518 as follows:

$$s'(k_x,\hat{j})=\hat{s}(k_x,\hat{j})\cdot\exp[j\Delta\Phi(k_x)] \qquad (17)$$

where $s'(k_x, \hat{j})$ is data after phase correction is performed on $\hat{s}(k_x, \hat{j})$.

In turn, weight and fast Fourier transform unit 1510 may process corrected range compressed data 1518 to form image 1520. In these examples, image 1520 may be expressed as:

$$x(i, \hat{j}) = \sum_{k_x} s'(k_x, \hat{j}) \cdot w(k_x) \cdot \exp\left(j2\pi\frac{k_x i}{K}\right) \qquad (18)$$

where $w(k_x)$ is weight function applied prior to inverse fast Fourier transform, and K is length of the inverse fast Fourier transform. Weighting may be widely used to reduce sidelobes at the cost of increased mainlobe of target response in spatial domain.

In these examples, weighting is applied in spatial frequency domain. Taylor weight is commonly used in synthetic aperture radar system. Weighting is included in these examples for flexibility, although performance may not be affected significantly by this term. A weighting case can be considered as applying uniform weights. Weighting functions generally have a bell shape, tapering toward the edges.

Next, entropy calculation unit 1512 processes image 1520 to generate an entropy value for the normalized image intensity of image 1520. The normalized pixel intensity may be calculated as follows:

$$I(i, \hat{j}) = \frac{|x(i, \hat{j})|^2}{\sum_{i,j} |x(i, \hat{j})|^2} \quad (19)$$

where $I(i, \hat{j})$ is normalized pixel intensity (power) at range index $\hat{j}$ and azimuth index i, $x(i, \hat{j})$ is processed subset image (after phase correction in each iteration loop), $\hat{j}$ is the range, and i is the azimuth index.

From normalized image intensity, an entropy value may be calculated as follows:

$$E = -\sum_{i,j} I(i, \hat{j}) \cdot \log(I(i, \hat{j})) \quad (20)$$

where E is the entropy of image intensity for image 1520 in these examples. This value may be output as entropy 1522 to optimization function 1504. In these examples, entropy 1522 is a target parameter that may be minimized using optimization function 1504.

Optimization function 1504 may perform an optimization function process to obtain an array of coefficients. In other words, optimization function 1504 may generate an array of coefficients that may be output as coefficients 1524. These coefficients are then used to generate a new phase correction that is output by phase correction unit 1514 as phase correction 1516. This phase correction is then applied to range compressed data 1505 to form corrected range compressed data 1518.

Image 1520 is generated, and entropy calculation unit 1512 calculates entropy 1522 which may have a new value based on coefficients 1524. This loop may continue with optimization function 1504 generating new values for coefficients 1524 until a step value for entropy 1522 is identified or reached when changes of entropy becomes less than the preset threshold value between iteration loops.

In these examples, the desired value for entropy 1522 is a minimum value. In other advantageous embodiments, the desired value may be obtained or identified based on comparing this value with a threshold or some desired effect such as image clarity and/or sharpness.

This array of coefficients may be optimized to produce a minimum value for entropy 1522. In these examples, the optimization may be performed using the Broyden-Fletcher-Goldfarb-Shammo (BFGS) method. This method may be used to solve the unconstrained non-linear optimization problems such as the one in autofocus 1500. Minimization of the entropy value may be performed as follows:

$$[v_{min}, E_{min}] = fminunc(@(v)amemo(v, \hat{s}, N), v0) \quad (21)$$

where $v_{min}$ is the array of coefficient variables in which entropy is minimized and $E_{min}$ is the minimum entropy that could be reached when phase error correction is applied using $v_{min}$; fminunc is the efficient unconstraint optimization function using the Broyden-Fletcher-Goldfarb-Shammo method; amemo is the objective function that includes expressions for phase correction, azimuth compression achieved by inverse Fourier transform and entropy calculation in a sequential manner with inputs of v, $\hat{s}$, and N; and v0 is the initial value of v that is set equal to zero. Here, N is the order of the polynomial, v is the array of coefficient variables with the initial value of v0, and $\hat{s}$ is range compressed data 1505 or equivalently the transformed data 516.

Optimization function 1504 outputs coefficients 1524, which may be used by phase correction unit 1514 to generate phase correction 1516. Once entropy 1522 has been minimized, objective function 1502 may output phase correction 1506 for use in focusing the image.

The illustration of autofocus 1500 is provided for purposes of showing one manner in which components used to perform autofocus may be implemented. This illustration is not meant to limit the manner in which other advantageous embodiments may be implemented. For example, in some advantageous embodiments, objective function 1502 may include a range selection process to select the appropriate portions of data for processing.

Figure 16:
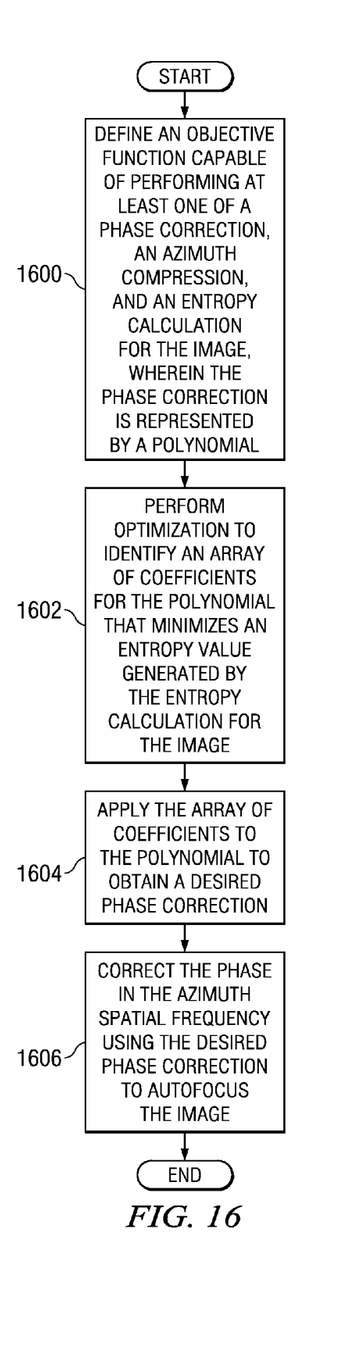
FIG. 16 is a flowchart of a process for autofocusing image data in accordance with an advantageous embodiment.

With reference now to FIG. 16, a flowchart of a process for auto-focusing an image is depicted in accordance with an advantageous embodiment. The process illustrated in FIG. 16 may be implemented in a radar data processing unit, such as radar data processing unit 500 in FIG. 5.

The process begins by defining an objective function capable of performing at least one of a phase correction, an azimuth compression, and an entropy calculation for the image (operation 1600). In this example, the phase correction is represented by a polynomial in the manner described above. As used herein, the phrase "at least one of" when used with a list of items means that different combinations one or more of the items may be used, and only one of each item in the list may be needed. For example, "at least one of item A, item B, and item C" may include, for example, without limitation, item A, or item A and item B. This example also may include item A, item B, and item C; or item B and item C.

The process performs optimization to identify an array of coefficients for the polynomial that minimizes an entropy value generated by the entropy calculation for the image (operation 1602). In operation 1602, the objective function may be used to generate new entropy values for different arrays of coefficients that may be generated during the optimization period.

This loop or feedback occurs to iteratively reduce the entropy value until the entropy value reaches some desired value or some number of iterations has occurred. In these examples, the desired value may be the minimum value within a tolerance threshold. The value selected may be one that reaches the minimum within a threshold or is more than the threshold away from the minimum depending on the particular implementation.

The process applies the array of coefficients to the polynomial to obtain a desired phase correction (operation 1604). The process then corrects the phase in the azimuth spatial frequency using the desired phase correction to autofocus the image (operation 1606), with the process terminating thereafter. The correction of the image in operation 1606 is performed by correcting the phase shift in the azimuth spatial frequency. In this manner, an image with a better focus than before may be generated.

Figure 17:
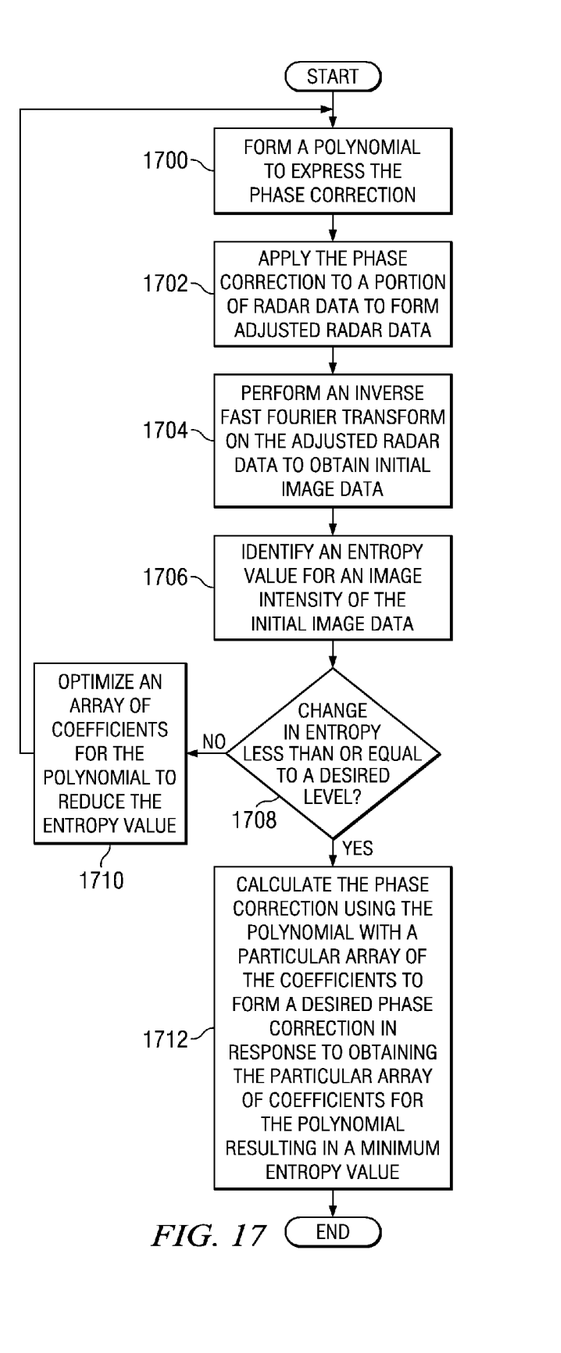
FIG. 17 is a flowchart of a process for generating phase correction in accordance with an advantageous embodiment.

With reference now to FIG. 17, a flowchart of a process for generating phase correction is depicted in accordance with an advantageous embodiment. The process illustrated in FIG. 17 may be implemented in an autofocus component such as, for example, autofocus 1500 in FIG. 15.

The process begins by forming a polynomial to express the phase correction (operation 1700). In operation 1700, the polynomial is formed by selecting coefficients for the polynomial. These coefficients may be from an array received by the process. Initially, these coefficients may have some initial default value. At a later point in time, the polynomial may be formed from new coefficients generated by later operations.

The phase correction is applied to a portion of radar data to form adjusted radar data (operation 1702). The radar data, in these examples, is range compressed radar data in which the data is expressed in terms of magnitude and phase.

The process performs an inverse fast Fourier transform on the adjusted radar data in azimuth spatial frequency to obtain initial image data (operation 1704). This initial image data is created using only a portion of the radar data in these examples. For example, this portion of the data may be a selected number of range bins within the total number of range bins for the image.

In this manner, a reduction in processing resources may occur. The portion of the radar data is selected such that an evaluation of the entropy levels can be made. In these examples, a set of range bins for the radar data is selected. An entropy value for an image intensity of the initial image data is identified (operation 1706).

A determination is made as to whether the entropy change from the previous iteration step is less than or equal to a desired level (operation 1708). If the entropy change is greater than a desired level, the process optimizes an array of coefficients for the polynomial to reduce the entropy value (operation 1710), with the process returning to operation 1700 as described above.

With reference again to operation 1708, if the entropy change is less than or equal to a desired level, no further optimization is needed. The process then calculates the phase correction using the polynomial with the particular array of coefficients to form a desired phase correction in response to obtaining a particular array of coefficients for the polynomial resulting in a minimum entropy value (operation 1712), with the process terminating thereafter.

In this manner, the process in FIG. 17 may iteratively apply coefficients to the polynomial, apply phase correction to the radar data, generate an image from the adjusted radar data, and identify an entropy value with the new array of coefficients until a minimum entropy value is reached within a specified threshold. In this depicted example, the desired entropy value is a minimum entropy value.

Depending on the optimal process used, other embodiments may set a threshold or value for the entropy to form the desired entropy value. In other words, optimization may cease if an entropy value or change in the entropy value reaches or is less than a selected value.

Thus, the different advantageous embodiments provide a method, apparatus, and computer program product for focusing images. A spatial model for spatial variation and phase error is identified for an image. The image may be divided into a number of subpatches based on the spatial model. These corrections apply to each of the number of subpatches to form a number of focused subpatches. The number of focused subpatches is then merged to form a focused image.

In the different advantageous embodiments, a subpatch size is identified to improve the focusing of the subpatches. This type of implementation is less complex than employing focusing using elevational data. Further, the different advantageous embodiments may be able to correct for phase error that change spatially and may be caused by sources other than changes in elevation of terrain. In this manner, the different advantageous embodiments provide independent local error phase correction for each subpatch with an ability to set subpatch coefficients based on the spatial variation.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art.

For example, the different advantageous embodiments may be applied to many types of mobile platforms in addition to the illustrative example in which the mobile platform is a satellite. These mobile platforms may be, for example, without limitation, air-based and/or space-based. More specifically, the different advantageous embodiments may be applied to, for example, without limitation, an aircraft, a spacecraft, a space station, a rocket, a missile, or some other suitable mobile platform.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for focusing an image, the method comprising:
   receiving an image comprising data collected from a synthetic aperture radar system;
   selecting a number of initial subpatches from the image, the number of initial subpatches not covering all of the image;
   estimating a phase error for each of the initial subpatches;
   creating a spatial model for spatial variation in phase error for the image based on the phase error for the initial subpatches, creating the model including determining a number of subpatches and the size of the number of subpatches, creating the spatial model including modeling a spatial version of the phase error for each of the initial subpatches using the phase error for the number of initial subpatches to form the spatial model;
   dividing the image into the number of subpatches based on the spatial model so as to cover the entire image with the number of subpatches;
   generating a number of coefficients for a polynomial for the phase error for each initial subpatch in the number of initial subpatches to form a number of sets of coefficients;
   fitting values for the number of sets of coefficients to form the spatial model;
   applying phase correction to each of the number of subpatches to form a number of focused subpatches, the applying phase correction including performing an optimization to identify an array of coefficients for a polynomial representing a phase correction in a manner that minimizes an entropy value generated by an entropy calculation for the image for each of the number of subpatches; and
   merging the number of focused subpatches to form a focused image.

2. The method of claim 1, wherein the image is an initially processed image and further comprising:
   interpolating radar data to form interpolated data;
   performing a range inverse fast Fourier transform on the interpolated data to form transformed data;
   autofocusing the transformed data to form globally focused data; and
   performing an azimuth inverse fast Fourier transform on the globally focused data to form the initially processed image.

3. The method of claim 1, wherein the dividing step comprises:
   identifying the number of subpatches using the spatial model; and
   dividing the image into the number of subpatches.

4. The method of claim 3, wherein the step of identifying the number of subpatches using the spatial model comprises:
   obtaining total phase changes from all phase order errors in a range direction and an azimuth direction; and
   dividing the total phase changes by a desired phase bound.

5. The method of claim 1, wherein the merging step comprises:
   performing one of combining overlapping areas in the number of focused subpatches using linear weighting or cutting and pasting to form the focused image.

6. The method of claim 1, wherein the applying step further comprises:
   applying the array of coefficients for the each of the number of subpatches to the polynomial to obtain a desired phase correction for the each of the number of subpatches; and
   correcting a phase error in the each of the number of subpatches using the desired phase correction to focus the each of the number of subpatches.

7. The method of claim 1, wherein the synthetic aperture radar system is located in an object selected from one of an aircraft, a spacecraft, and a satellite.

8. An apparatus comprising:
   an autofocus process capable of receiving an image comprising data collected from a synthetic aperture radar system; selecting a number of initial subpatches from the image, the number of initial subpatches not covering all of the image; estimating a phase error for each of the initial subpatches; creating a spatial model for spatial variation in phase error for an image based on the phase error for the initial subpatches, creating the model including determining a number of subpatches and the size of the number of subpatches including modeling a spatial version of the phase error for each of the number of initial subpatches to form the spatial model; generating a number of coefficients for a polynomial for the phase error for each initial subpatch in the number of initial subpatches to form a number of sets of coefficients; fitting values for the number of sets of coefficients to form the spatial model; dividing the image into the number of subpatches based on the spatial model so as to cover the entire image with the number of subpatches; applying phase correction for each of the number of subpatches to form a number of focused subpatches, the applying phase correction including performing an optimization to identify an array of coefficients for a polynomial representing a phase correction in a manner that minimizes an entropy value generated by an entropy calculation for the image for each of the number of subpatches; and merging the number of focused subpatches to form a focused image; and
   a computer, wherein the autofocus process executes on the computer.

9. The apparatus of claim 8, wherein the image is an initially processed image, and wherein the autofocus process is further capable of interpolating radar data to form interpolated data; performing a range inverse fast Fourier transform on the interpolated data to form transformed data; autofocusing the transformed data to form globally focused data; and performing an azimuth inverse fast Fourier transform to form the initially processed image.

10. The apparatus of claim 8, wherein in estimating the phase error for the number of initial subpatches, the autofocus process is capable of generating a number of coefficients for a polynomial for the phase error for each initial subpatch in the initial number of subpatches to form a number of sets of coefficients.

11. The apparatus of claim 10, wherein in modeling the spatial version of the phase error for the number of initial subpatches to form the spatial model, the autofocus process is capable of fitting values for the number of sets of coefficients to form the spatial model.

12. The apparatus of claim 11, wherein in dividing the image into the number of subpatches based on the spatial model, the autofocus process is capable of identifying the number of subpatches using the spatial model, and dividing the image into the number of subpatches.

13. The apparatus of claim 8 further comprising:
a synthetic aperture radar system capable of generating radar data for the image.

14. The apparatus of claim 8 further comprising:
a mobile platform, wherein the synthetic aperture radar system is located on the mobile platform.

15. The apparatus of claim 14, wherein the mobile platform is selected from one of an aircraft, a spacecraft, and a satellite.

16. A non-transitory computer program product for focusing an image, the computer program product comprising:
a computer recordable storage medium;
program code, stored on the computer recordable storage medium, for receiving an image comprising data collected from a synthetic aperture radar system;
program code, stored on the computer recordable storage medium, for selecting a number of initial subpatches from the image, the number of initial subpatches not covering all of the image;
program code, stored on the computer recordable storage medium, for estimating a phase error for each of the initial subpatches;
program code, stored on the computer recordable storage medium, for creating a spatial model for spatial variation in phase error for the image based on the phase error for the initial subpatches, creating the model including determining a number of subpatches and the size of the number of subpatches, creating the spatial model including modeling a spatial version of the phase error for each of the initial subpatches using the phase error for the number of initial subpatches to form the spatial model;
program code, stored on the computer recordable storage medium, for dividing the image into the number of subpatches based on the spatial model so as to cover the entire image with the number of subpatches;
code, stored on the computer recordable storage medium, for generating a number of coefficients for a polynomial for the phase error for each initial subpatch in the number of initial subpatches to form a number of sets of coefficients;
code, stored on the computer recordable storage medium, for fitting values for the number of sets of coefficients to form the spatial model;
program code, stored on the computer recordable storage medium, for applying phase correction to each of the number of subpatches to form a number of focused subpatches, the applying phase correction including performing an optimization to identify an array of coefficients for a polynomial representing a phase correction in a manner that minimizes an entropy value generated by an entropy calculation for the image for each of the number of subpatches; and
program code, stored on the computer recordable storage medium, for merging the number of focused subpatches to form a focused image.

17. The computer program product of claim 16, wherein the image is an initially processed image and further comprising:
program code, stored on the computer recordable storage medium, for interpolating radar data to form interpolated data;
program code, stored on the computer recordable storage medium, for performing a range inverse fast Fourier transform on the interpolated data to form transformed data;
program code, stored on the computer recordable storage medium, for autofocusing the transformed data to form globally focused data; and
program code, stored on the computer recordable storage medium, for performing an azimuth inverse fast Fourier transform on the globally focused data to form the initially processed image.

* * * * *